United States Patent [19]

Vann

[11] Patent Number: 4,876,820

[45] Date of Patent: Oct. 31, 1989

[54] FISHING PLANER

[76] Inventor: William C. Vann, 79 S.Underwood Dr., Garden City, S.C. 29576

[21] Appl. No.: 296,624

[22] Filed: Jan. 13, 1989

[51] Int. Cl.[4] ............................................. A01K 95/00
[52] U.S. Cl. .................................................. 43/43.13
[58] Field of Search ................. 43/43.12, 43.22, 43.13

[56] References Cited

U.S. PATENT DOCUMENTS

| 2,235,868 | 3/1941 | Coolidge et al. | |
| 3,466,787 | 9/1969 | Collins | 43/43.13 |
| 3,808,727 | 5/1974 | Flanders | 43/43.13 |
| 3,835,573 | 9/1974 | Borchardt | 43/43.13 |
| 3,897,648 | 8/1975 | Neary | 43/43.13 |
| 3,898,759 | 8/1975 | Jensen | 43/43.13 |
| 4,128,959 | 12/1978 | Staaden | 43/43.13 |
| 4,129,956 | 12/1978 | Neary | 43/43.13 |
| 4,199,891 | 4/1980 | Davis | 43/43.13 |
| 4,486,970 | 12/1984 | Larson | 43/43.13 |
| 4,567,687 | 2/1986 | Even | 43/43.13 |
| 4,581,842 | 4/1986 | Kalberer | 43/43.13 |

Primary Examiner—M. Jordan
Attorney, Agent, or Firm—Needle & Rosenberg

[57] ABSTRACT

A fishing planer includes a planer body with a weight mounted at the leading edge thereof. The planer body is also provided with a pair of concavities and convexities located in a front portion of the body and having holes extending therethrough. The concavities and convexities and holes essentially allow transfer of water underneath the planer body to the upper surface of the planer body in order to increase differential forces acting on the upper surface of the planer body to enhance its diving capability. A first embodiment utilizes a looped bail to connect the planer body to the reel line. A second embodiment utilizes a rotatable tripping lever to connect the planer body to the reel line.

15 Claims, 3 Drawing Sheets

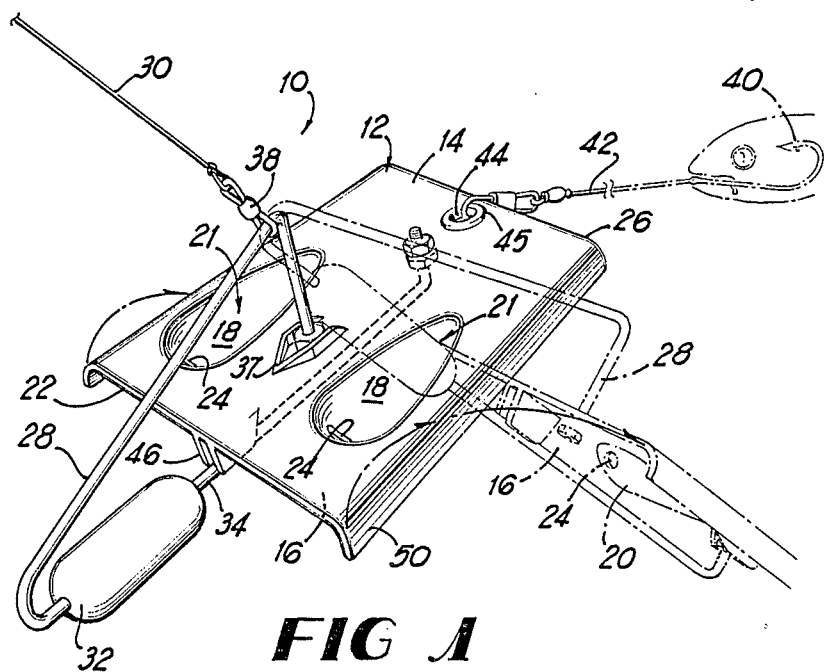
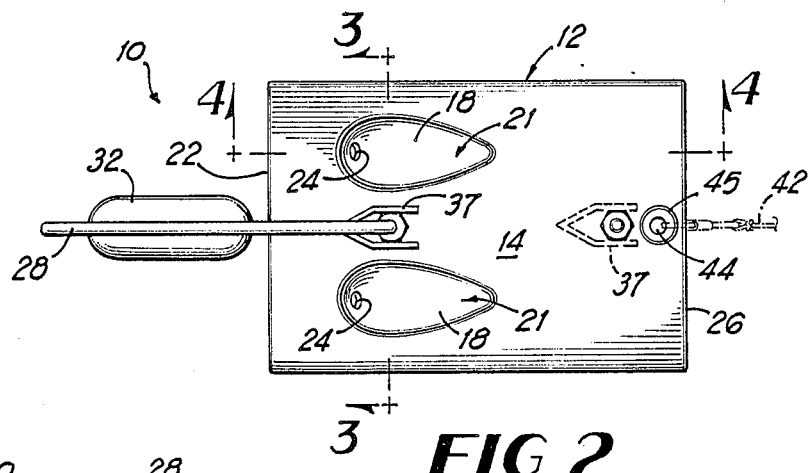
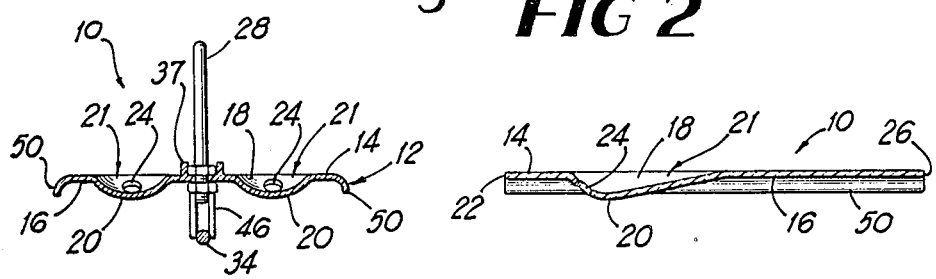
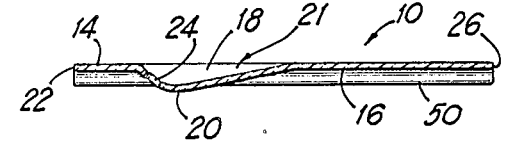
FIG 1
FIG 2
FIG 3
FIG 4

FISHING PLANER

BACKGROUND OF THE INVENTION

This invention relates to a fishing apparatus, and more particularly to improved fishing planers which are capable of reaching desired depths at slower trolling speeds and with less ballast weight than otherwise would be required.

Trolling is a very popular and effective method of fishing for fish which may be found at varying depths depending on the species of fish, the time of day, the season of the year, and the water temperature, as well as other factors. In trolling, a lure, attached to a reel line, is pulled through the water behind a moving boat. Often, the highest degree of success is achieved by placing the lure at the deepest depth at which the fish are likely to be found.

Troll fishermen commonly use planers or divers in order to place the lure at a desired depth. Such planers or divers assume a particular angular orientation during trolling to accomplish a desired hydrodynamically induced diving effect and are generally reasonably effective in bringing the lure to the desired depth. The depth to which the planer will bring the lure is determined by a number of factors including the length of the reeling line, the trolling speed, the diameter of the line, the weight of the line, and the weight configuration and buoyancy of the lure. However, prior art divers and planers have some important disadvantages which hamper their effectiveness and make their use more troublesome.

One prior art planer which incorporates a plane body to hydrodynamically bring the planer down to the desired depth and a ballast weight to assist in attaining the desired depth is disclosed in U.S. Pat. No. 4,128,959 to Staaden. The ballast weight of the Staaden device is also used, as typically with most other planers, to also alter the center of gravity of the device in order to keep the planer at the desired angle while being towed for maximum hydrodynamic effect. The Staaden device incorporates a member strip underneath the planer body in order to give structural strength to the bail. Although the Staaden device is made structurally strong to resist the rigors of trolling, it must depend essentially on the flat smooth surface of the planer body and the ballast weight to bring it down to a desired deep depth, and the hydrodynamics of such a shaped planer body require that the planer be towed at a relatively fast speed in order for it to be brought down to a deep depth. A problem exists in that rapid towing speed may be too fast to get the attention of the fish, and consequently the fisherman using such a fast moving planer may have only very limited success in catching the fish. In addition, requiring that the trolling be performed at a relatively fast speed adds to the expense of fishing because of energy costs. Simply adding additional ballast weight to bring it to a lower depth is also impractical and disadvantageous because the increased weight makes it more difficult for the lure and the planer to be brought to the surface again at the end of trolling or when a fish has been caught. Thus, adding additional ballast weight makes it more difficult to play the fish. In addition, this prior art device must be positioned in the water at the proper angle to achieve the required hydrodynamic effect which places it at the desired depth.

Another prior art planer device which uses a somewhat more complicated system is disclosed in U.S. Pat. No. 4,129,956 to Neary. The Neary device essentially incorporates a keel to allow the planer to dive vertically as it gets down to the predetermined desired depth. When a fish takes a hook, pressure is applied to a cotter-key to overcome a spring pressure and essentially release a bar holding the plane at a desired position. When this occurs the angle of the plane is altered and the device can be brought to the surface by the towing line. A disadvantage with this device, however, is that it has a somewhat complicated structure and has many surfaces which result in a lot of drag or water resistance. Consequently it presents a lot of resistance to the towing boat, and more directly to the fisherman. In addition, as with the Staaden device, it requires a relatively fast rate of towing to bring it to the desired level. Moreover, the Neary device, with its spring system and keel, is somewhat complicated to manufacture and therefore is more expensive than desired.

Other prior art devices incorporate means to alter the positioning of the ballast weight in order to control the diving angle of the devices. An example of such a prior art plane is disclosed in U.S. Pat. No. 3,466,787 to Collins. Lead shot, which is used in a ballast container is shiftable forward when the plate is tilted downward and vice-versa in order to vary the location of the center of gravity of the device. However, this device requires the use of a structure which moves within a slot to shift the weights, and because of this requirement for free sliding movement, any kind of corrosion caused by salt water or other such debris which might get in that area may cause the device to malfunction. In addition, as with the other prior art devices disclosed, the Collins device is not energy efficient and instead requires a fast towing speed in order to bring it to a desired depth.

Other prior art devices have features which allow the user to make adjustments to the planer in order to compensate for lures of various weights and having different drag factors. In addition, such adjustable planers may also allow the planer to be changed from its retrieval position to its dive position while submerged. Thus, such planers need not be taken out of the water in order to reset the planer to its dive position, as in the instance of a fish that has caught the bait but has since been lost. An example of such a prior art device is given in U.S. Pat. No. 4,581,842 to Kalberer. Essentially, the Kalberer planer device utilizes a spring to exert a biasing force on the planer mast which is connected to the reeling line. However, as with the other prior art devices disclosed, the Kalberer planer does not yield an energy efficient diver but instead requires also that the towing boat be moving at a fast rate. In addition, the Kalberer device has another important disadvantage in that it is very complex and therefore expensive to manufacture. This complexity also can introduce a certain amount of unreliability to the device because there is consequently an additional mechanism in the device which can malfunction.

Still other prior art planers such as that disclosed in U.S. Pat. No. 4,486,970 to Larson, provide the planer body with a particular shape to increase the hydrodynamically induced diving effect. The Larson planer has a cambered lower surface portion and a somewhat less cambered upper surface portion which are designed to increase the forces on the planer body which push it down, thereby enabling it to attain deeper depths. However, a primary disadvantage with such planers is that these increased forces produced by the cambered surfaces also make it more difficult to play the caught fish.

Yet another prior art planer, disclosed in U.S. Pat. No. 3,898,759 to Jensen, utilizes a tripping lever hingedly attached to the planer body and an adjustable magnetic ballast which engages the lever. The magnetic ballast keeps the planer in the dive position until a fish catches the bait and pulls the lever from engagement with the ballast allowing the lever to rotate and align the planer body with the reel line. However, a primary disadvantage with such a device is that salt deposits and corrosion in the hinge connection may prevent proper rotation of the lever, thereby causing malfunction. Thus, such devices require routine cleaning and maintenance and are trouble prone as well as expensive to manufacture due to their complex mechanisms.

A fishing planer is thus needed that will yield its desired hydrodynamic diving effect at relatively slow towing speeds. In addition, a fishing planer is desired that is relatively simple in construction and therefore more trouble-free and less prone to malfunction.

SUMMARY OF THE INVENTION

It is an object of the present invention to provide a planer which can attain relatively deep depths at relatively slow towing speeds.

It is an object of the present invention to provide a planer capable of being reset into the dive position by simply submerging it in the water.

It is also an object of the present invention to provide a fishing planer which is relatively simple in construction.

It is yet another object of the present invention to provide a fishing planer which has few moving parts.

It is still another object of the present invention to provide a fishing planer which resists corrosion and is durable.

The unique structure of the fishing planer of the present invention provides improved hydrodynamics allowing the planer to reach desired depths at relatively slow trolling speeds. Slower trolling speeds reduce fuel costs due of the towing boat, increase the chances of catching more fish, and reduce the thickness or poundage of the fishing line. The fishing planer of the present invention achieves these objectives without the addition of any complicated mechanisms.

The fishing planer has a body which is provided with a pair of depressions or concavities at the upper surface and a pair of convexities at the lower surface thereof, and into which the concavities fit. A hole extends through the concavities and the convexities. The hole allows water, which is swirling around underneath the planer body while it is being towed, to flow into the holes and out into the concavity to the upper surface of the planer body. This action both increases water flow at the upper surface of the planer body and decreases cavitation underneath the body. The end result is that the fishing planer can attain deeper depths at slower towing speeds.

The planer body is also provided with a looped bail in order to securely connect the planer to a reeling line. The planer body is connected to a bait line by means of a grommeted aperture at a suitable portion of the body. When a fish bites the lure, the resistance to motion provided by the added weight and size of the fish tends to level out the planer body bringing it into general alignment with the reel line and thus stops the hydrodynamic diving action of the planer. Due to the changed angular orientation of the planer, it may be pulled to the surface with the fish caught on the lure. After the fish is taken off the hook, the planer may be simply dropped back into the water where it will assume the proper diving position without having to be manually reset and will thus resume its diving action without additional unnecessary effort on the part of the fisherman.

Instead of the rigid looped bail structure described above, another embodiment utilizes a rotatable lever. The lever fits through a slot which extends through the planer body and which extends lengthwise in the fore and aft directions of the planer body. The lever is provided with a stop pin which prevents the lever from falling completely through the slot and also is provided with a stop member which is situated at the lower end of the lever and prevents the lever from being pulled completely through the slot. This stop member also allows the lever to pull the planer through the water when the lever is attached to the reeling line at its upper end. When a fish bites the lure which is attached to the trailing edge of the planer body, the drag of the fish will exert a pulling force on the trailing edge and cause the lever to rotate within the slot and level out the planer body as with the previous embodiment. After removing the fish from the lure, the planer may similarly be simply dropped back into the water where it will resume its proper angular position without having to be manually reset by the fisherman.

This embodiment may also be provided with the concavities, holes, and turbo ports described in the previous embodiment. However, it may also be effectively utilized without these features.

The planer body is provided with a ballast weight which is situated at the leading edge of the planer body. The weight provides both a ballast to the body enabling it to sink deeper in the water during trolling and also places the center of gravity of the planer at a location closer to the leading edge of the planer body as desired.

The planer body is preferably composed of plastic which generally renders the planer body impervious to the marine environment. Thus, the planer body will not rust or corrode as with other planers which are composed of stainless steel or other metal. Consequently, the planer of the present invention is very durable and its simplicity of construction renders it maintenance and trouble free as well as relatively inexpensive to manufacture.

BRIEF DESCRIPTION OF THE DRAWINGS

FIG. 1 is a perspective view of a first embodiment of the present invention shown connected to a lure and a reeling line, and showing the angular position it will assume when trolling and the angular position it will assume when a fish has caught the bait.

FIG. 2 is a top view of the embodiment of the invention shown in FIG. 1.

FIG. 3 is a sectional view of the embodiment of the invention shown in FIG. 2 and taken along lines 3—3.

FIG. 4 is a side view of the embodiment of the invention shown in FIG. 2 with the ballast weight removed.

DETAILED DESCRIPTION OF THE PREFERRED EMBODIMENT

Figure 5A:
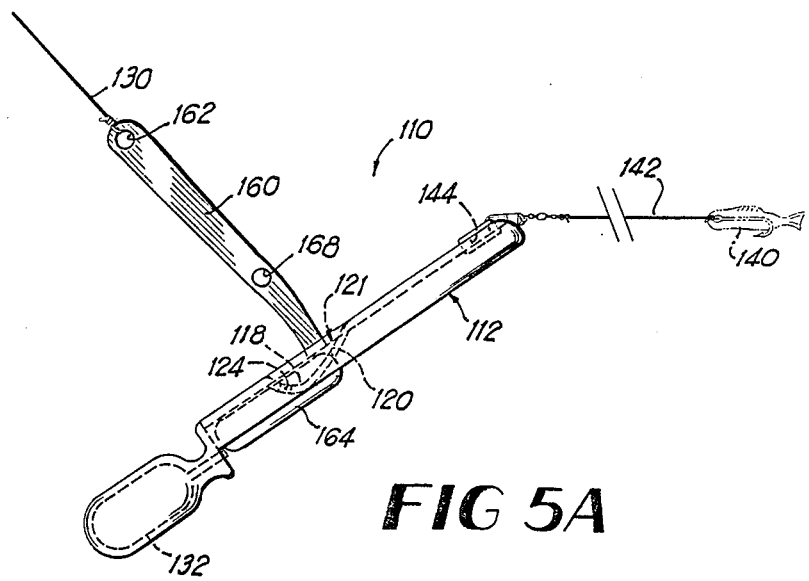
FIG. 5a is a side elevational view of the second embodiment of the invention shown connected to a lure and to a reeling line and shown in the angular position it will assume during trolling.

Referring now to the drawings, FIGS. 1 and 2 show a first embodiment of the invention generally designated by the numeral 10. Planer 10 has a planer body 12 which is generally flat as shown in FIG. 1. Planer body 12 has an upper surface 14 and a lower surface 16. Planer body 12 has concavities 18 at the upper surface 14. The concavities 18 extend from the upper surface 14 to the lower surface 16 to form and fit into convexities 20 at the lower surface 16. The general shape of the concavities 18 and convexities 20 is shown in FIGS. 1, 2 and 4. FIG. 4 is a side view of the planer 10. As shown in more detail in FIG. 1, the concavities 18 (which may include one or more concavities) and the convexities 20 (which may include one or more convexities) have a curvature which is more accentuated toward the leading edge 22 of the planer body 12. The concavities 18, convexities 20, and holes 24 are generally designated as turbo structures 21. Holes 24 are provided which extend through concavities 18 and convexities 20. The holes 24 are preferably located approximately in the center of the concavities 18 and convexities 20. However, alternatively, holes 24 may be located proximal the center of, and in a front portion of, the concavities 18 and convexities 20. The holes 24 allow passage of water swirling underneath the planer body 12 and coming from the general direction of the trailing edge 26 to pass through the holes 24 into the area above the upper surface 14 of the body 12. This allows water from underneath the planer body 12 to mix with water that is flowing on the upper surface 14 of the planer body 12. Turbo structures 21 allow the planer body 12 essentially to move water from underneath the planer body 12 to the upper surface 14 of the planer body 12. This increases flow of water going over the top surface of the planer body 12 and reduces flow of water underneath, in effect increasing the pressure at the top of the planer body 12 and reducing swirl turbulence and cavitation underneath the body 12. Consequently, this increases the differential forces tending to push the planer body 12 down and enable it to go to greater depths than would otherwise be possible with a specified velocity of water flow striking the angled upper surface 14. Without limiting the invention to any particular theory of operation, it is believed that the concavities 18 assists water flow through hole 24 into the area above the body 12 by acting as a sort of nozzle (due to its particular shape), and convexities 20 assists water flow into hole 24 by means of its particular protruding shape which acts to guide water flow. Thus, the planer body 12 can more effectively utilize the speed of the tow boat to accomplish its purpose of reaching a desired depth.

Bail 28 attaches the planer body 12 to a reel or reeling line 30. Bail 28 is preferably securely attached to the planer body 12 by means of its insertion into the body 12, its threaded portion and a nut securing bail 28 thereto. Nut securing means 37, which are molded into the body 12, may be used in order to prevent the nuts from loosening. The bail 28 is also secured at the leading edge 22 of the planer 10 to a weight 32. Weight 32 is preferably attached at the leading edge 22 of the body. Preferably, bail 28 has a lower portion 34 which extends from the weight 32 and connects to body 12 also by means of a threaded portion, nut securing means 37, and a simple nut connected thereto. Lateral support means 46 extends from lower surface 16 for receiving bail portion 34 to provide enhanced stability to bail 28 and weight 32. Bail 28 may simply be connected to the reel line 30 by means of a simple ring 38 which allows variable positioning of the reel line on the bail to accommodate movement of the reel line's 30 attachment point to bail 28 such as occurs when a fish has caught the bait or when the planer 10 is reaching its desired depth resulting in its angular positioning.

The weight 32 serves two purposes. One purpose is to act as ballast for causing the planer 10 to sink into the water. The other purpose is to position the center of gravity of the planer 10 where desired in order to ensure that the planer body achieves the proper angle to allow the hydrodynamics of water flowing above and below the planer body 12, as described hereinabove, to essentially push the planer body 12 into the depths desired.

The lure or bait 40 shown in FIG. 1 is attached by means of a lure line 42 to a lure line aperture 44 which is suitably positioned at or near the trailing edge 26 of the body 12. Aperture 44 is preferably provided with a grommet 45. When a fish has caught the bait, the added weight of the fish and the bulk of the fish produces water resistance or drag on the moving planer body 12 which exerts a force tending to pull on the planer body 12 at its connection at the lure line aperture 44 so as to level out the planer body 12 and bring it into general alignment with reel line 30. Once the planer body 12 is leveled out, the hydrodynamic effect which achieves essentially the diving of the planer 10 to the desired depths ceases. Instead, once the planer has "caught" a fish the planer body 12 will tend to be pulled to the surface allowing the fish to be removed from the lure. After the fish is unhooked, the structural simplicity and inherent balance of the planer 10 allows the planer body 12 to achieve the proper angle for diving to the depths desired utilizing the hydrodynamics discussed above by simply resubmerging the planer 10. Thus, there is no need to "reset" the planer 10 after it has been taken out of the water or after a fish has been removed from the lure. In effect planer 10 resets itself automatically once it is submerged.

Figure 5B:
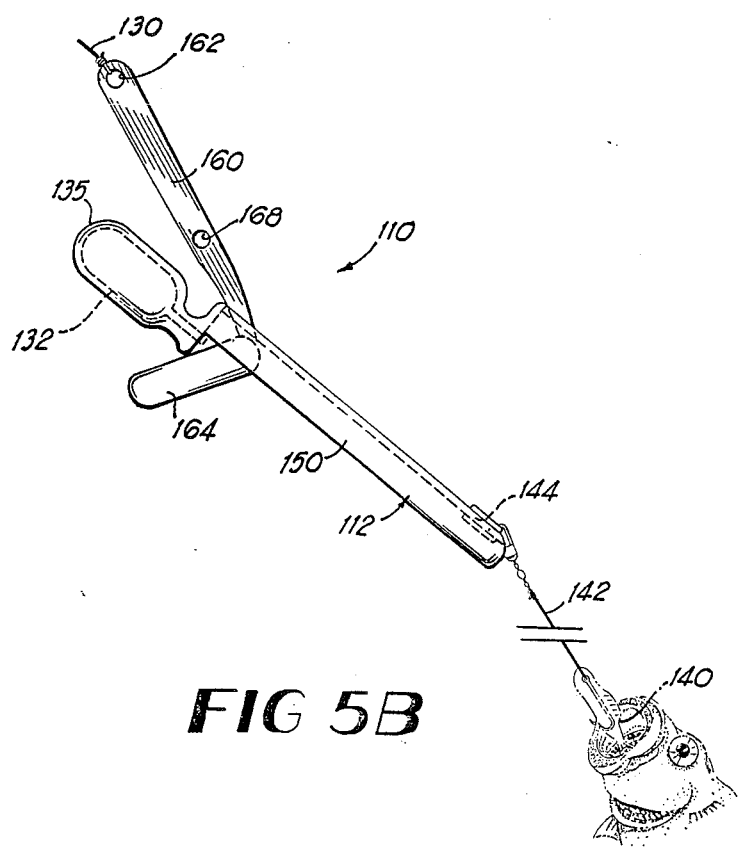
FIG. 5b is a side elevational view of the embodiment of the invention shown in FIG. 5a, also shown connected to a lure and to a reeling line and showing the angular position it will assume when a fish has caught the bait.
Figure 6:
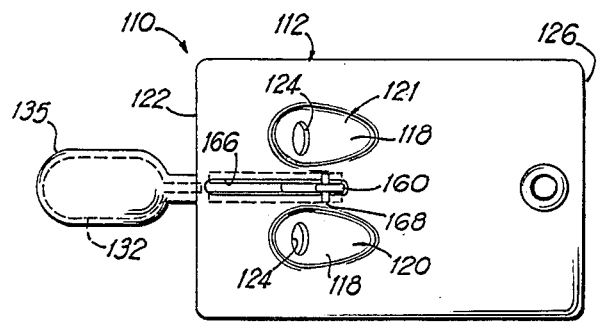
FIG. 6 is a top view of the embodiment of the invention shown in FIGS. 5a and 5b.

FIGS. 5a, 5b, and 6 show the second embodiment of the invention which is similar to that of FIGS. 1 through 4 in that the planer body 112 is generally a flat surface except for concavities 118, convexities 120 and holes 124 (or turbo structures 121). Embodiment 110, however, has a tripping lever 160. Tripping lever 160 is connected to the reel line 130 by a conventional aperture 162 in the tripping lever 160. The tripping lever 160 has a stop member 164 at the bottom portion thereof. Stop member 164 is dimensionally larger than slot 166 into which tripping lever 160 is inserted. Tripping lever 160 is not connected to body 112 so that it can freely move (preferable both longitudinally and rotationally) within slot 166. The slot 166 is shown in more detail in FIG. 6. Preferably, slot 166 extends longitudinally of the body 112 and in the forward half of the body 112. Stop member 164 acts as a counterweight for lever 160 and also prevents lever 160 from being pulled out of the slot 166 when the reel line 130 is pulling on the lever 160 during the trolling in order to move the planer body 112 through the water. In operation, when the planer body 112 is being pulled through the water by a tow boat, member 164 is up against the under surface 116 of planer body 112. Stop pin 168 is preferably positioned at a medial portion of the tripping lever 160, and extends laterally therethrough to prevent the lever 160 from falling through the slot 166. The weight 132 at the leading edge 122 of the planer body 112 also serves as both a ballast and a means to position the center of gravity of the embodiment 110 where desired. Weight 132 may be encapsulated in plastic (by means of enclosure 135). The weight 132 is connected directly to the leading edge 122.

When a fish is caught on the lure 140, which is attached to lure line 142 and thereby to lure line aperture 144, the resistance of the fish to the water flow will result in the planer body 112 leveling out as shown in FIG. 5b. This leveling out results in rotation of the tripping lever 160 so that lever 160 and body 112 are positioned as shown in FIG. 5b. Tripping lever 160 is preferably contoured as shown in FIG. 5b so as to avoid contact with weight 132 upon this rotational movement. Once a fish has been caught, the planer body 112 is no longer in an angled position for diving to the desired depth but is generally aligned with reel line 130 so that it is instead generally angled. Therefore, when the water flow strikes its lower surface 116, the planer embodiment 110 will tend to rise to the surface. As with embodiment 10, after a fish has been removed from the lure 140, the planer embodiment 110 may be resubmerged in the water where it will resume the proper angle for utilizing the hydrodymanics to dive to the desired depth. Thus, there is no need to manually reset the embodiment 110 due to its simplicity of construction and unique trip lever structure.

Figure 7:
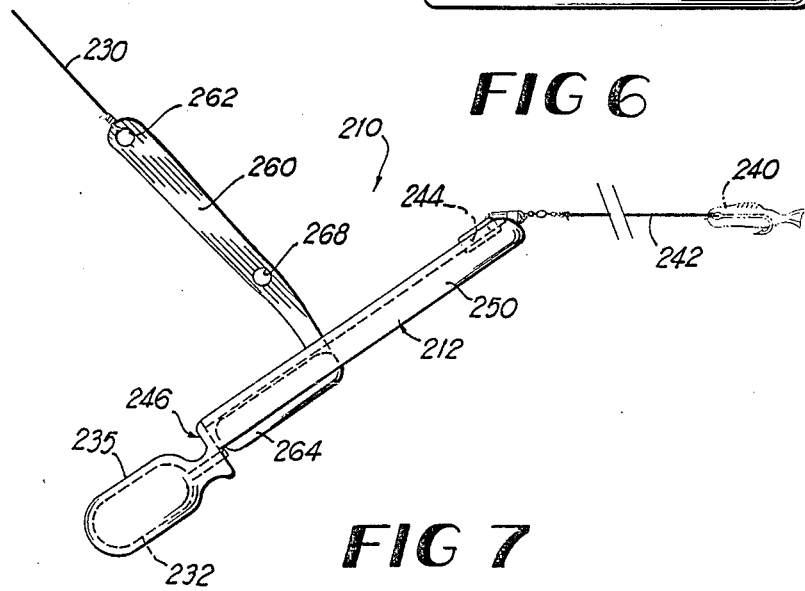
FIG. 7 is a side elevational view of the third embodiment of the invention similar to that of FIGS. 5a, 5b, and 6, except that there is no concavity in the planer body.
Figures 8, 9:
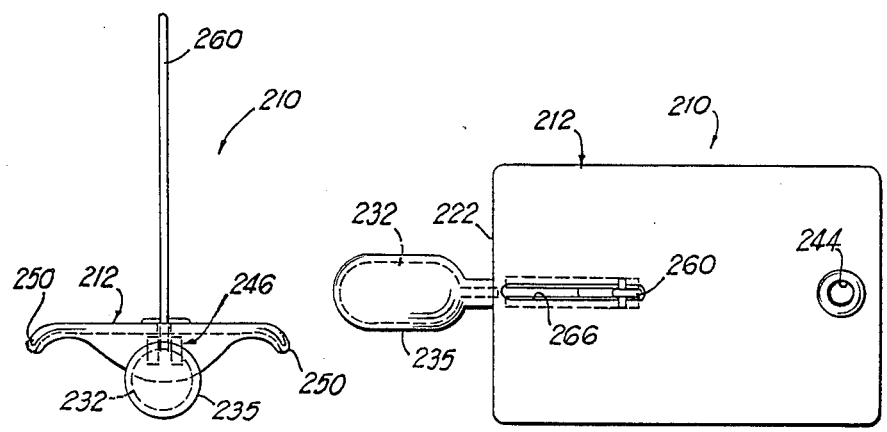
FIG. 8 is a rear view of the embodiment of the invention shown in FIG. 7.
FIG. 9 is a top view of the embodiment of the invention shown in FIGS. 7 and 8.

FIGS. 7, 8 and 9 show a third embodiment of the invention which is similar to that of FIGS. 5a, 5b and 6 except that there is no turbo structure. In addition, the lip 246 of leading edge 222 preferably extends across a front of the body 212 without a cutaway portion. Planer body 212 is connected to lure 240 by means of lure line 242 connected at aperture 244. Embodiment 210 also has a tripping lever 260 connected to reel line 230 by aperture 262 therein. Tripping lever 260 also has stop pin 268 and stop member 264 and preferably fits rather snugly in slot 266 while allowing free movement of lever 260 therein. This snug fit generally minimizes wobbling of the planer body 212 when it is being pulled through the water as well as when a fish has been caught. The weight 232, which may be encapsulated in plastic by means of plastic enclosure 235, serve the same function as in embodiment 110. Similar in operation to embodiment 110, once a fish has been caught, rotation of lever 260 of embodiment 210 generally levels out the planer body 212 so that it is generally in line with the reeling line 230. Embodiment 210 is also automatically reset once it is resubmerged in the water and will reposition itself at the proper angle for utilizing hydrodynamic forces to dive to the desired depth.

Embodiments 10, 110, and 210, preferably have bodies 12, 112, and 212 which are composed of a plastic material. This allows the invention to be more durable because the body will not rust; it will not corrode; and it will not tend to chemically react to the salt water and other chemicals in the marine environment so that maintenance on the planer is minimized. In addition, this minimizes the likelihood that the apertures or slots will clog so as to hamper operation of the planer. Moreover, turbo structures 21 and 121 are preferably located in a front portion of bodies 12 and 112 in order to maximize water flow through holes 24 and 124. In addition, embodiments 10, 110, and 210 all preferably have lips 50, 150 and 250 at lateral portions of the bodies 12, 112, and 212. The lips 50, 150, and 250 curve around towards the undersurface of the planer bodies and reduce turbulence caused by water flow around the lateral ends of the planer bodies 12, 112, and 212.

Accordingly, there has been provided, in accordance with the invention, a fishing planer which is more effective and efficient in bringing the lure down to the desired depth that fully satisfies the objectives set forth above. It is to be understood that all the terms used herein are descriptive rather than limiting. Although the invention has been described in conjunction with the specific embodiments set forth above, many alternative embodiments, modifications and variations will be apparent to those skilled in the art in light of the disclosure set forth herein. Accordingly, it is intended to include all such alternatives, embodiments, modifications, and variations that fall within the spirit and scope of the invention as set forth in the claims herein below.

What is claimed is:

1. A fishing planer, comprising:
   a planer body having an upper surface and a lower surface, said planer body having a concavity on the upper surface extending into a convexity on the lower surface, said concavity and said convexity having a hole extending therethrough to allow water flowing under said planer body to pass therethrough to the upper surface of said planer body to mix with water flowing over the upper surface in order to reduce swirl below said planer body;
   means for attaching said planer body to a reel line; and
   means for attaching said planer body to a bait line.

2. The fishing planer of claim 1, further including a bail secured to said planer body for connecting said planer body to the reeling line.

3. The fishing planer of claim 2, wherein said bail is secured to said planer body at said upper surface.

4. The fishing planer of claim 1, wherein said concavity is a plurality of concavities and said convexity is a plurality of convexities.

5. The fishing planer of claim 1, further including a weight mounted on said body, for maintaining said body at a desired angle relative to the water surface while the planer is submerged and during trolling.

6. The fishing planer of claim 1, wherein said convexity and said concavity are located at a rear portion of said body.

7. The fishing planer of claim 1, wherein said planer body has a lateral lip at lateral edges of the body for directing water flow around the body to minimize turbulence under said planer body.

8. The fishing planer of claim 1, further including an enclosure for said weight, said enclosure preventing material from said weight from contaminating the water.

9. The fishing planer of claim 8, wherein said enclosure is composed of plastic.

10. A fishing planer, comprising:

a planer body having an upper surface and a lower surface, said body having a slot and a concavity on the upper surface extending into a convexity on the lower surface, said concavity having a hole extending therethrough to allow water flowing under said planer body to pass therethrough to the upper surface to mix with water flowing over the upper surface in order to reduce water swirl below said planer body;

a tripping lever movably positioned in the slot in order to allow said lever to rotate relative to said body and to allow free movement of said lever within the slot, said tripping lever connected at one end to a reel line;

a stop member connected to said tripping lever at the other end thereof;

a pin mounted on said lever, said pin being dimensionally wider than said slot and said stop member being dimensionally larger than the slot to prevent said lever from passing completely through the slot in order to retain said lever within the slot; and means for attaching said planer body to a bait line.

11. The fishing planer of claim 10, further including a weight mounted on said planer body for maintaining said body at a desired angle relative to the water surface while submerged and during trolling.

12. The fishing planer of claim 10, further including an enclosure for said weight, said enclosure preventing material from said weight from contaminating the water.

13. The fishing planer of claim 10, wherein said lever is contoured at a medial portion thereof to prevent said lever from contacting said weight and impeding rotation of said lever.

14. The fishing planer of claim 10, wherein said means for attaching includes an aperture in said body.

15. The fishing planer of claim 10, wherein said body is composed of plastic.

* * * * *